United States Patent [19]

Balter

[11] Patent Number: 4,683,763
[45] Date of Patent: Aug. 4, 1987

[54] ROTARY MOTION FEED-THROUGH APPARATUS

[75] Inventor: Valentin Balter, Cupertino, Calif.

[73] Assignee: Huntington Mechanical Laboratories, Inc., Mt. View, Calif.

[21] Appl. No.: 865,233

[22] Filed: May 20, 1986

[51] Int. Cl.⁴ .............................................. F16J 15/50
[52] U.S. Cl. ..................................... 74/18.1; 464/104
[58] Field of Search .......................... 74/18, 18.1, 800; 464/102, 104

[56] References Cited

U.S. PATENT DOCUMENTS

| | | | |
|---|---|---|---|
| 1,702,762 | 2/1929 | Brubaker | 74/18.1 |
| 1,731,009 | 10/1929 | King | 74/18.1 |
| 2,065,834 | 12/1936 | Swennes | 74/18.1 X |
| 2,107,090 | 2/1938 | Swennes | 74/18.1 X |
| 2,610,410 | 9/1952 | L'Abee-Lund | 74/18.1 X |
| 2,659,569 | 11/1953 | Ehlke | 74/18.1 X |
| 2,725,754 | 12/1955 | Munro | 74/18.1 |
| 2,771,781 | 11/1956 | Ranson | 74/18.1 |
| 2,978,914 | 4/1961 | Gut | 74/18.1 |
| 3,201,094 | 8/1965 | Lison et al. | 74/18.1 |
| 3,232,126 | 2/1966 | Pucciarello et al. | 74/18.1 |

Primary Examiner—Leslie Braun
Assistant Examiner—Dirk Wright
Attorney, Agent, or Firm—Townsend and Townsend

[57] ABSTRACT

A feed-through apparatus for use in rotating a shaft which typically forms part of a system. The apparatus includes a feed-through shaft which is to be rotated and structure for rotatably mounting the shaft on a panel or wall. A cap rotatably coupled to the mount has a driver coupled with it, the driver including a stub shaft having bearings at one end thereof received within a groove of an end face of the driven shaft. The driver includes a cylindrical member mounted by a bearing in the inner periphery of the cap, such inner periphery being provided with a beveled surface so that the cylindrical member and the stub shaft wobble when the cap is rotated. When the bearings on the outer end of the stub wobble, they move along a circular path surrounding the central axis of the driven shaft, causing the driven shaft to rotate in the direction of movement of the bearings on the driver. The cap can either be a manually rotated knob or can be a stepper motor or a structural part for coupling the knob to a stepper motor. The apparatus of the present invention avoids the need for a bent shaft as in the prior art.

7 Claims, 5 Drawing Figures

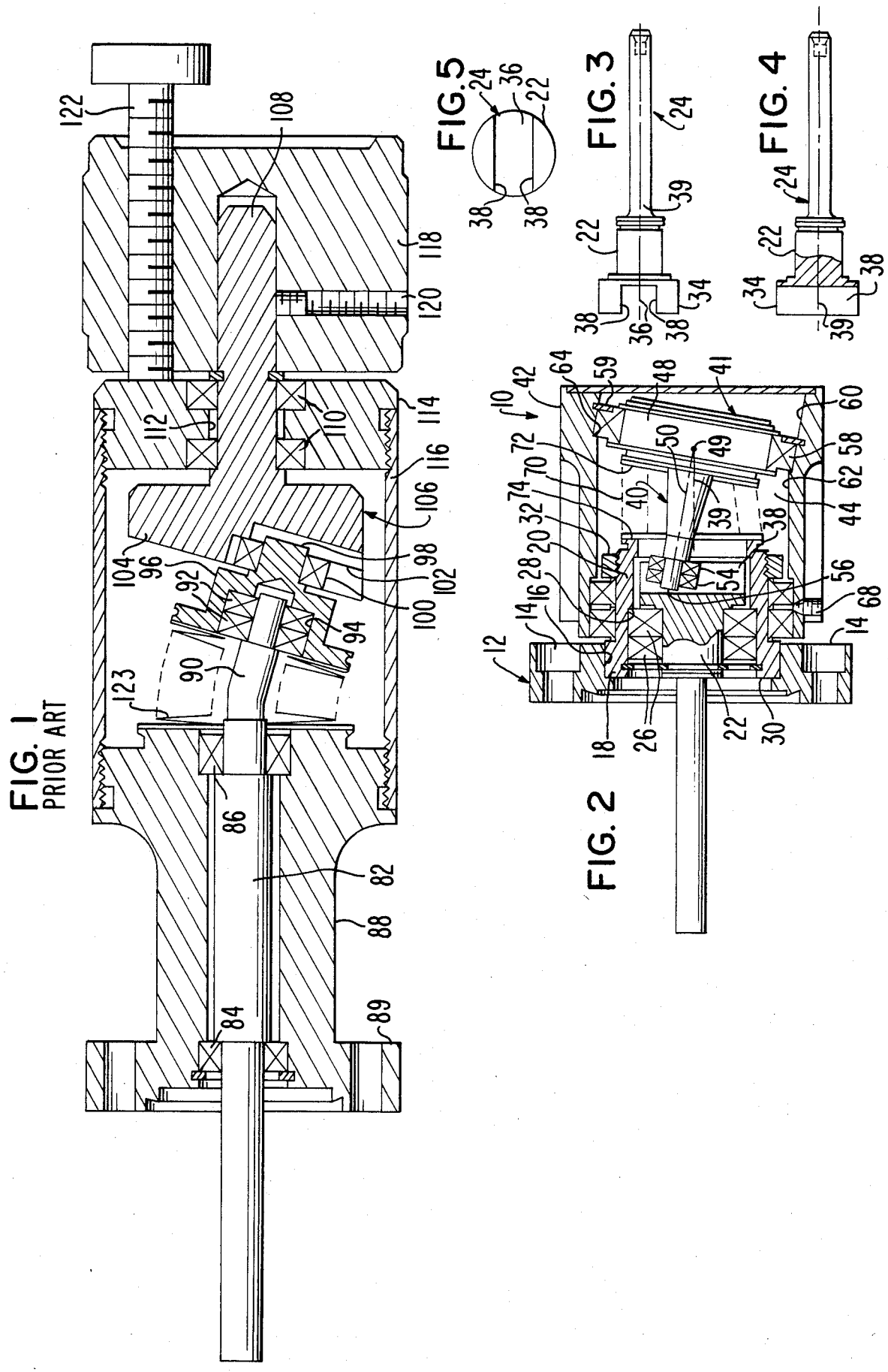

ROTARY MOTION FEED-THROUGH APPARATUS

This invention relates to improvements in motion feed-through devices in vacuum and other systems and, more particularly, to a rotary motion feed-through apparatus by which a feed-through or driven shaft can be rotated quickly and easily and without excessive strain or stress thereon.

BACKGROUND OF THE INVENTION

It is often desirable or necessary to mount a shaft extending into a closed system such that rotary motion can be imparted to the shaft from a location outside the system as the mount for the shaft remains sealed to the system. This is especially true in vacuum systems where it would be clearly impractical to shut the system down to enter the system merely to rotate the shaft. For instance, with a test specimen mounted on the shaft in the system, it may become necessary or desirable to change the operative position of the sample on the shaft with respect to a predetermined reference. For this purpose, rotary motion feed-through mechanisms have been known and used in the past.

A typical mechanism for this use has been one in which the feed-through or rotary shaft of the mechanism has one short end segment which is bent out of longitudinal alignment with the main, straight segment so that the bent segment can be coupled by bearing means in a groove in the beveled face of a rotary element to which a knob or stepper motor can be attached. Thus, by rotating the knob or actuating the stepper motor, the rotary element is rotated to, in turn, rotate the bent segment of the shaft and thereby the shaft itself. While this arrangement has been found to be satisfactory in some cases, it has drawbacks. Among these include the fact that it is difficult to bend the shaft accurately to a predetermined angle, such as 10°. When the shaft is bent, it is subject to internal structural stresses which weaken the shaft. Thus, when torque is applied to the shaft, such torque tends to straighten the shaft and the rotational effect imparted to a part coupled with the shaft is diminished, at least to a certain extent. Moreover, the rotary element to which the bent shaft segment is coupled must be machined accurately to form the beveled face thereof so that the face is properly positioned relative to the bent shaft segment. This requires precision machining and a considerable amount of time and expense.

Because of the foregoing drawbacks, a need exists for improvements in such mechanisms and the present invention satisfies such a need.

SUMMARY OF THE INVENTION

The present invention satisfies the aforesaid need by providing a feed-through apparatus for imparting rotary motion to a shaft wherein the apparatus includes a driver which is coupled with a rotary means so that the driver is caused to wobble about an axis extending at an angle relative to the axis of the shaft to be rotated. Such wobbling action of the driver is imparted to the driven shaft because one end of the driven shaft has a slot or groove which receives a wobbling part of the driver. The wobbling action of the wobbling part received in the slot of the driven shaft imparts a rotary motion to the driven shaft because the wobbling part follows a circular path about the axis of the driven shaft as such part remains in the groove of the driven shaft.

A main advantage of the use of the present invention is the fact that there is no bent shaft segment forming part of the driven shaft as in prior art mechanisms; thus, there is no stress imparted to the driven shaft which could diminish the rotational movement of the driven shaft. Moreover, only a single machined recess, namely the groove of the driven shaft, is necessary, and it is not necessary to match two different angles of two different parts as in the prior art as described above.

The primary object of the present invention is, therefore, is to provide an improved rotary motion feed-through apparatus which is simple and rugged in construction, is formed from a relatively few number of parts, and avoids stresses in the rotary driven shaft of the apparatus.

Another object of the present invention is to provide an apparatus of the type described wherein the driven shaft is rotated as a function of the wobbling action of an elongated driver which wobbles about a point at the intersection of the axis of the driven shaft and the axis of the driver, whereby the driver need not be connected to thereby simplify the structure by which the driver is coupled with the driven shaft to impart rotary motion to the driven shaft.

Other objects of this invention will become apparent as the following specification progresses, reference being had to the accompanying drawing for an illustration of the invention and an illustration of a prior art mechanism.

IN THE DRAWING

FIG. 1 is a cross-sectional view of a rotary motion feed-through apparatus of the prior art;

FIG. 2 is a cross-sectional view of a rotary motion feed-through apparatus of the present invention;

FIG. 3 is a side elevational view, partly broken away and in section, of a rotary driven shaft forming part of the apparatus of FIG. 2;

FIG. 4 is a view similar to FIG. 3 but showing the driven shaft after it has been rotated through an angle of 90°; and FIG. 5 is an end elevational view of the shaft.

The feed-through mechanism or apparatus of the present invention is broadly denoted by the numeral 10 and includes a mounting ring 12 for mounting apparatus 10 on a panel or other structure. To this end, ring 12 has a number of holes 14 therethrough for receiving machine screws or other fasteners for securing the ring to the panel.

Ring 12 has an inner peripheral surface 16 and an end face 18 for receiving and containing, respectively, a sleeve 20 which surrounds a cylindrical, enlarged segment 22 of a feed-through or driven shaft 24 which extends outwardly and to the left through ring 12 as shown in FIG. 2. Sleeve 20 is typically secured rigidly to ring 12, such as by welding or silver soldering.

Segment 22 of shaft 24 is mounted by a pair of bearings 26 within sleeve 20 for rotation relative to the sleeve about the longitudinal axis of the shaft 24. Bearings 26 are coupled to sleeve 20 against a shoulder 28 thereof, and a retainer ring 30 carried by sleeve 20 retains the bearings 26 in place and effectively couples shaft segment 22 of shaft 24 to sleeve 20. The sleeve 20 is held in place by welding against shoulder 18. Nut 32 threaded onto the inner end segment of sleeve 20 as shown in FIG. 2 holds a pair of bearings 43 in place on the sleeve.

The details of shaft 24 are shown in FIGS. 3-5. To this end, shaft 24 includes an end extension 34 integral with segment 22. Extension 34 is generally cylindrical except that it has a groove or slot 36 formed therein to present a pair of generally parallel, flat faces 38 which are on opposite sides of the central axis of shaft 24 as shown in FIG. 4. Thus, groove 36 is symmetrical relative to the axis 39 of shaft 24 and the groove extends diametrically across the cylindrical extension 34.

A driver shaft 40 is coupled to shaft 24. The driver shaft 40 is coupled to a driver means 41 which includes a cylindrical cap 42 which is hollow to present a space 44 for containing driver shaft 40 and a cylindrical member 48 rigid to one end of the driver shaft 40, the axis 50 of driver shaft 40 being coextensive with the central axis of cylindrical member 48.

The opposite end of driver shaft 40 is provided with a pair of bearings 54, held onto the shaft by a flathead screw 56. The length of shaft 46 is such that bearings 54 are located in groove 36 (FIG. 4) of driven shaft 24.

The outer periphery of cylindrical member 48 is provided with an annular bearing 58 which is coupled by a retaining ring 59 to a beveled surface 60 on the inner peripheral surface 62 of cap 42 near one end thereof. Retaining ring 59 is carried by cap 42 and retains bearing 58 against an annular shoulder 64 on cap 42. A set screw 68 is carried by cap 42 near one end thereof for loading bearings 43 to thereby couple the cap to the outer races of the bearings and allow the cap to rotate relative to sleeve 20.

Cap 42 is used to impart a wobbling action to driver shaft 40. This wobbling action occurs about a point 49 which is at the intersection of axis 39 of driven shaft 24 and axis 50 of driver shaft 40. The wobbling action occurs while there is no rotation of cylindrical member 48 and driver shaft 40 about axis 50. Cap 42 can be replaced by a reversible stepper or other motor, if desired.

A bellows 70 extends between an end face 72 of member 48 and an end face 74 of sleeve 20 to cover and isolate the space extending between member 48 and sleeve 20 in surrounding relationship to driver shaft 40, groove 36 and bearings 54. Thus, apparatus 10 can be used with a vacuum system.

In use, ring 12 is typically mounted on some suitable structure, such as the exterior of a closed system which contains the space to be evacuated. The driven shaft 24 extends into the system and may be used to mount any one of a number of different structural parts, such as a part for mounting a sample for use in a test. The purpose of apparatus 10 is to permit selective rotation of driven shaft 24 and thereby the structural part attached thereto in the system.

With the structural part to be rotated coupled to the driven shaft 24, and with ring 12 coupled to a panel of the system, changes in the angular position of driven shaft 24 can be made by rotating cap 42 about its central axis which is coincident with axis 39 of driven shaft 24. As the cap is rotated, it causes cylindrical member 48 and thereby driver shaft 40 to wobble about point 49 at which the central axis of driven shaft 24 and the central axis of driver shaft 40 intersect. The driver shaft 40 does not rotate about its central axis 50 as the driver shaft 40 wobbles about point 49. However, it does cause the end of the driver shaft 40 to move in a circular path. As it moves along a circular path, it causes rotation of driven shaft 24 in one direction because bearings 54 engage and slide along the inner surfaces 38 (FIG. 4) of groove 36 of driven shaft 24. Thus, rotation of cap 42 in one direction causes rotation of driven shaft 24 in the same direction. Conversely, as cap 42 is rotated in the opposite sense, driven shaft 24 is rotated in such opposite sense.

The wobble action of driver shaft 40 occurs because cap 42 rotates while cylindrical member 48 remains non-rotative. Because of the beveled surface 60 on the inner periphery of cap 42, and because of bearing 58, the cylindrical member 48 remains non-rotative with respect to rotation about axis 50 but cylindrical member 48 can wobble relative to cap 42 about point 49. As cylindrical member 48 wobbles, it causes bearings 54 to move through a circular path and because the bearings are in groove 36, the circular movement of the bearings 54 along the circular path is converted into rotation of driven shaft 24 relative to ring 12.

The apparatus of the present invention is to be contrasted in structure with a prior art feed-through mechanism 80 shown in FIG. 1 which includes a feed-through or driven shaft 82 which is rotatably mounted in bearings 84 and 86 at the ends of a tubular element 88 which has a flange 89 adapted to be secured to a panel or other structure of a system in which the rotation of shaft 82 is to be used.

Shaft 82 has an angular segment 90 which is integral with the main portion of the shaft. Shaft segment 90 is provided with a pair of bearings 92 at the outer end thereof and the bearings are located within an annular space 94 of a cylindrical element 96. Element 96 has a stub shaft 98 carried by bearings 100 in a groove 102 formed in a beveled face 104 of a rotating member 106, the latter having a shaft 108 rotatably mounted by bearings 110 within the tubular center space 112 of a cap 114 to which is threaded a sleeve 116, the opposite end of the sleeve being threaded to member 88 as shown in FIG. 1. A cap 118 is rigidly secured by a set screw 120 to shaft 108. A screw 122 can be used to lock cap 118 against rotation relative to cap 114. A bellows 123 extends between element 88 and element 96.

As cap 118 is rotated by hand, it rotates element 106 about the longitudinal axis of shaft 108 and as it does so, it rotates cylindrical element 96 which, in turn, rotates shaft segment 90 and thereby shaft 82. Shaft segment 90 is rotated about the longitudinal axis of shaft 82.

A main disadvantage of the use of the prior art apparatus 80 as shown in FIG. 1 is that the driven shaft 82 is bent to form shaft segment 90. It is difficult to bend the shaft to a predetermined angle, such as 10°. When the shaft is bent, it puts structural stresses in the driven shaft. When torque is on the shaft it tends to straighten the shaft and to lose the rotational effect for which shaft 82 is so mounted.

With the use of the apparatus of FIG. 2, there is no bent shaft; thus, there is no stress. There is only one machined recess, namely groove 36, and it is not necessary to match two angled devices, such as segment 90 of FIG. 1 and recess 94 of member 96 of FIG. 1. As a result, apparatus 10 of the present invention is much simpler in construction, gives greater efficient operation of the rotation of driven shaft 24, and minimizes the number of parts that need to be used.

I claim:

1. A rotary feed-through mechanism comprising:
   a driven shaft having a central axis;
   means coupled with the driven shaft for mounting the driven shaft for rotation about the central axis of the driven shaft;

a driver member spaced from the driven shaft and having a first part and a second part, the first part having an outer periphery surrounding the central axis of the driven shaft;

means having a cylindrical inner surface surrounding the first part of the driver member for rotating about the driver member, the central axis of the inner surface being transverse to and intersecting the central axis of the driven shaft;

means coupling the outer periphery of the first part of the driver member with said inner surface to cause wobbling of the driver member about the point of intersection of the central axis of said driven shaft and said inner surface in response to the rotation of said rotating means about the central axes thereof; and means coupled to said driven shaft and responsive to the wobbling action of the second part of said driven member for rotating the driven shaft about said central axis thereof relative to said mounting means.

2. A mechanism as set forth in claim 1, wherein said driver member has a cylindrical outer peripheral surface, and said inner surface being cylindrical, said coupling means including a bearing between and engaging said cylindrical surfaces.

3. A mechanism as set forth in claim 1, wherein said rotating means includes a device carried by said mounting means for rotation about said central axis, said device having said inner surface thereon.

4. A mechanism as set forth in claim 1, wherein said causing means includes a driver shaft coupled to said driver member and extending outwardly therefrom toward the driven shaft, said driven shaft having a recess therein, the outer end of the driver shaft being shiftably received within the recess.

5. A mechanism as set forth in claim 4, wherein said recess is a groove extending diametrically across one end face of the driven shaft.

6. A mechanism as set forth in claim 4, wherein said driver shaft has a bearing on the outer end thereof, said recess being defined by a pair of flat, parallel side faces on the driven shaft, said bearing being shiftably engageable with said side faces.

7. A mechanism as set forth in claim 4, wherein said driver shaft has a central axis coincident with the central axis of the rotating means.

* * * * *